(12) United States Patent
Wu

(10) Patent No.: US 7,266,105 B2
(45) Date of Patent: Sep. 4, 2007

(54) METHOD FOR DETERMINING TRIGGERING OF A PDCP SEQUENCE NUMBER SYNCHRONIZATION PROCEDURE

(75) Inventor: Chih-Hsiang Wu, Taipei Hsien (TW)

(73) Assignee: Innovative Sonic Limited, Tortola (VG)

( * ) Notice: Subject to any disclaimer, the term of this patent is extended or adjusted under 35 U.S.C. 154(b) by 943 days.

(21) Appl. No.: 10/249,177

(22) Filed: Mar. 20, 2003

(65) Prior Publication Data
US 2003/0210676 A1 Nov. 13, 2003

Related U.S. Application Data

(60) Provisional application No. 60/319,240, filed on May 10, 2002.

(51) Int. Cl.
*H04J 3/22* (2006.01)
*H04Q 7/24* (2006.01)

(52) U.S. Cl. ....................... 370/338; 370/469

(58) Field of Classification Search .............. 370/338, 370/331, 466, 350, 503, 310, 349, 394, 469; 445/436, 438
See application file for complete search history.

(56) References Cited

U.S. PATENT DOCUMENTS 6,725,040 B2 * 4/2004 Jiang .......................... 455/436

| | | | |
|---|---|---|---|
| 6,862,450 B2 * | 3/2005 | Mikola et al. | 455/438 |
| 2002/0001298 A1 * | 1/2002 | Tourunen et al. | 370/349 |
| 2002/0091860 A1 * | 7/2002 | Kalliokulju et al. | 709/247 |
| 2002/0191556 A1 * | 12/2002 | Krishnarajah et al. | 370/329 |
| 2003/0008653 A1 * | 1/2003 | Jiang | 455/436 |

FOREIGN PATENT DOCUMENTS

WO    WO 01/47206 A2    6/2001

OTHER PUBLICATIONS

ETSI TS 125 323 V5.0.0; Universal Mobile Telecommunications System (UMTS); Packet Data Convergence Protocol (PDCP) specification (3GPP TS 25.323 version 5.0.0 Release 5); Mar. 2002; pp. 1-21; XP-002259036.

* cited by examiner

*Primary Examiner*—Chau Nguyen
*Assistant Examiner*—Hicham B Foud
(74) *Attorney, Agent, or Firm*—Birch, Stewart, Kolasch & Birch, LLP

(57) ABSTRACT

33When an RRC procedure is combined with an SRNS Relocation procedure, a PDCP synchronization procedure is performed only if a next expected UL/DL Receive PDCP sequence number invalidity event is detected during the SRNS Relocation procedure. If no such invalidity event is detected, then no PDCP sequence number synchronization procedure is performed. If the RRC procedure is not executed in combination with the SRNS Relocation procedure, then the PDCP sequence number synchronization procedure is performed only if: (1) The RRC procedure causes the RLC entity that is used by the PDCP entity to be re-established; or, (2) The RRC procedure causes the header compression protocol used by the PDCP entity to be changed.

12 Claims, 22 Drawing Sheets

METHOD FOR DETERMINING TRIGGERING OF A PDCP SEQUENCE NUMBER SYNCHRONIZATION PROCEDURE

CROSS REFERENCE TO RELATED APPLICATIONS

The application claims the benefit of U.S. Provisional Application No. 61/319,240, filed May 10, 2002, and included herein by reference.

BACKGROUND OF INVENTION

1. Field of the Invention

The present invention relates to a wireless communications network. In particular, the present invention discloses a method for determining when a packet data convergence protocol (PDCP) sequence number synchronization procedure should be performed.

2. Description of the Prior Art

Please refer to FIG. 1. FIG. 1 is a block diagram of a wireless communications network 10, as defined by the 3$^{rd}$ Generation Partnership Project (3GPP) specifications 3GPP TS 25.322 V3.10.0 "RLC Protocol Specification", 3GPP TS 25.331 V3.10.0 "Radio Resource Control (RRC) Specification", and 3GPP TS 25.303 V3.11.0 "Interlayer procedures in Connected Mode", which are included herein by reference. The wireless communications network 10 comprises a plurality of radio network subsystems (RNSs) 20 in communications with a core network (CN) 30. The plurality of RNSs 20 is termed a Universal Mobile Telecommunications System (UMTS) Terrestrial Radio Access Network, or UTRAN for short. Each RNS 20 comprises one radio network controller (RNC) 22 that is in communications with a plurality of Node Bs 24. Each Node B 24 is a transceiver, which is adapted to send and receive wireless signals. In particular, the wireless communications network 10 assigns a mobile unit 40 (generally termed a "UE" for User Equipment) to a particular RNS 20, which is then termed the serving RNS (SRNS) 20s of the UE 40. Data destined for the UE 40 is sent by the CN 30 to the SRNS 20s. This data is in the form of service data units (SDUs) 28 that are held by the RNC 22 of the SRNS 20s pending transmittal by one of the Node Bs 24. The RNC 22 selects a Node B 24 that is best able to accurately transmit the SDUs 28 to the UE 40. Such a selection will depend, for example, upon the location of the UE 40 within the domain of the SRNS 20s. The UE 40 broadcasts SDUs 48 to the wireless communications network 10, which are then picked up by the SRNS 20s and forwarded to the CN 30. Occasionally, the UE 40 may move close to the domain of another RNS 20, which is termed a drift RNS (DRNS) 20d. A Node B 24 of the DRNS 20d may pick up the signal transmitted by the UE 40. The RNC 22 of the DRNS 20d forwards the received signal to the SRNS 20s. The SRNS 20s uses this forwarded signal from the DRNS 20d, plus the corresponding signals from its own Node Bs 24 to generate a combined signal that is then decoded and finally processed into SDUs 28. The SRNS 20s then forwards these received SDUs 28 to the CN 30. Consequently, all communications between the UE 40 and the CN 30 must pass through the SRNS 20s.

Please refer to FIG. 2 in conjunction with FIG. 1. FIG. 2 is a simple block diagram of the UMTS radio interface protocol architecture. Communications between the UE 40 and the UTRAN 20u is effected through a multi-layered communications protocol that includes a layer 1, a layer 2 and a layer 3, which together provide transport for a signaling plane (C-plane) 92 and a user plane (U-plane) 94. Layer 1 is the physical layer 60, and in the UTRAN 20u is responsible for combining signals received from the DRNS 20d and SRNS 20s. Layer 2 includes a packet data convergence protocol (PDCP) layer 70, a Radio Link Control (RLC) layer 72, and a Medium Access Control (MAC) layer 74. Layer 3 includes a Radio Resource Control (RRC) layer 80. The U-plane 94 handles user data transport between the UE 40 and the UTRAN 20u, whereas the C-plane 92 handles transport for signaling data between the UE 40 and the UTRAN 20u. The RRC 80 sets up and configures all channels between the UTRAN 20u and the UE 40. The PDCP layer 22 provides header compression for Service Data Units (SDUs) received from the U-plane 94 to increase bandwidth utilization efficiency. The RLC layer 72 provides segmentation and concatenation of PDCP 70 SDUs and RRC 80 SDUs into RLC protocol data units (RLC PDUs), and under acknowledged mode (AM) transfers, can provide upper layers (such as the PDCP layer 70 or the RRC layer 80) with a confirmation that RLC PDUs have been successfully transmitted and received between the UTRAN 20u and the UE 40. The MAC layer 74 provides scheduling and multiplexing of RLC PDUs onto the transport channel, interfacing with the physical layer 60.

Before proceeding, it is worth taking note of terminology used in the following. An SDU is any packet that is received from an upper layer or passed to an upper layer, whereas a PDU is a packet generated by a layer and passed on to a lower layer or received from a lower layer. Hence, a PDCP PDU is an RLC SDU. Similarly, an RLC PDU is a MAC SDU, and so forth. As such, whether a packet is termed a "PDU" or an "SDU" will depend upon the point of view of the layer being considered. In general, each layer will add information, typically in the form of a header, to SDU data to generate a PDU.

Each PDCP PDU generated by the PDCP layer 70 in response to an SDU received from the U-plane 94 is incrementally assigned a 16-bit sequence number (SN) by the PDCP layer 70 if a so-called lossless property is configured for the connection. That is, each sequentially successive PDCP PDU generated by the PDCP layer 70 is assigned an incrementally higher SN. For example, at a given instant in a stream of PDCP PDUs, a first PDCP PDU may be assigned an SN of 62 by the PDCP layer 70. A second PDCP PDU generated immediately after the first PDCP PDU would thus be assigned an SN of 63, and so on. When a PDCP entity is first set-up, the first PDCP PDU of the entity has an SN of zero. The SNs are not actually a part of the PDCP PDUs, but are internally maintained by the PDCP layer 70. The PDCP PDUs are then delivered to the RLC layer 72 for transmission. Since bandwidth is to be maximized by the compression of the U-plane SDU headers, each PDCP PDU should, ideally, be smaller in size than its corresponding U-plane SDU. To ensure that this is indeed the case, the PDCP headers should be kept as small as possible, and to provide for this, PDCP SNs are generally not transmitted in their associated PDCP PDUs. Similarly, each PDCP PDU received from the RLC layer 72 is incrementally assigned an SN by the PDCP layer 70. Hence, two unique sets of PDCP SNs exist: one for PDCP PDUs received from the RLC layer 72, and another for PDCP PDUs generated from U-plane 94 SDUs.

As the UE 40 moves closer towards the domain of the DRNS 20d, a decision is eventually made by the wireless network 10 to place the UE 40 under the DRNS 20d, and a transfer process is enacted. This process is termed an SRNS relocation procedure, and under certain transport modes is a lossless procedure. Lossless means that no PDCP SDUs 28, 48 are lost during the relocation procedure. Please refer to FIG. 3 in conjunction with FIGS. 1 and 2. FIG. 3 is a block diagram of the UE 40 undergoing a lossless SRNS relocation procedure. The DRNS 20d becomes a target RNS (TRNS) 20t. After completion of the relocation procedure, the TRNS 20t will serve as the new SRNS 20s for the UE 40. In order for the TRNS 20t to properly take up its job as the new SRNS 20s for the UE 40, the current SRNS 20s must forward key information to the TRNS 20t. Please refer to FIG. 4 in conjunction with FIGS. 2 and 3. FIG. 4 is a message sequence chart for the prior art lossless SRNS relocation procedure. The SRNS 20s sends forwarding information 50 to the TRNS 20t. This forwarding information includes a downlink sending sequence number (DL Send_SN) 52, an uplink receiving sequence number (UL Receive_SN) 54, and all unconfirmed PDCP SDUs 28. The multi-layered communications protocol used by both the SRNS 20s and the UE 40 enables the UE 40 to confirm those PDCP PDUs transmitted by the SRNS 20s that are successfully received by the UE 40. Any PDCP PDUs not explicitly confirmed as received by the UE 40 are termed unconfirmed PDCP PDUs. As each PDCP SDU 28 has a corresponding PDCP PDU, an unconfirmed PDCP PDU generally means that there is a corresponding unconfirmed PDCP SDU 28. These unconfirmed PDCP SDUs 28 are forwarded by the SRNS 20s to the TRNS 20t. The DL Send_SN 52 is the value of the SN associated with the sequentially earliest unconfirmed PDCP SDU. As the SNs are not explicitly carried in the PDCP PDUs, this enables the PDCP layer 70 in the TRNS 20t to properly associate an SN for the corresponding PDCP PDU of each forwarded PDCP SDU 28. The UL Receive_SN 54 is the value of the SN associated with a PDCP SDU that the SRNS 20s next expects to receive from the UE 40. This enables the TRNS 20t to properly associate an SN for each PDCP SDU subsequently received from the UE 40. The TRNS 20t sends the UL Receive_SN 54 to the UE 40. From this, the UE 40 can determine which PDCP SDUs to begin sending to the TRNS 20s under its guise as the new SRNS 20s. The UE 40 sends a downlink receiving sequence number (DL Receive_SN) 58 to the TRNS 20s. The DL Receive_SN 58 holds the value of the SN of the next PDCP SDU that the UE 40 is expecting to receive from the TRNS 20t. From this, the TRNS 20t can learn which of the forwarded unconfirmed PDCP SDUs 28 to begin sending to the UE 40. Consider, as an example, a situation in which the SRNS 20s has sent PDCP PDUs, each of which has a corresponding PDCP SDU, to the UE 40 having associated SNs running from 0 to 99. We may further assume that, of these 100 PDCP PDUs sent, only those with SNs running from 0 to 50 were confirmed by the UE 40. Consequently, there are unconfirmed PDCP PDUs with SNs running from 51 to 99, each of which has a corresponding unconfirmed PDCP SDU 28. Also, the SRNS 20s has received 200 PDCP PDUs, each of which has a corresponding PDCP SDU, from the UE 40, with SNs running from 0 to 199. In the SRNS relocation procedure, the PDCP SDUs 28 with associated SNs running from 51 to 99 are forwarded by the SRNS 20s to the TRNS 20t. The DL Send_SN 52 would have a value of 51, and the UL Receive_SN 54 would have a value of 200. The DL Receive_SN 58 will hold a value that is between 51 and 100, depending on how many of the unconfirmed PDCP PDUs were actually received by the UE 40, but not yet confirmed. If, for example, the DL Receive_SN 58 holds a value of 90, then the TRNS 20t knows that it may discard the forwarded PDCP SDUs 28 that have associated SNs that run from 51 to 89, and will begin transmitting those forwarded PDCP SDUs 28 with associated SNs that are from 90 and above. Although it should not happen, it is possible that the DL Receive_SN 58 will either be sequentially before the DL Send_SN 52 or sequentially after the SN associated with the sequentially last forwarded PDCP SDU 28. Similarly, it is possible for the UL Receive_SN 54 to be sequentially before the last PDCP PDU that that UE 40 considered confirmed as successfully transmitted, or sequentially after the SN of the PDCP PDU that the UE 40 next expects to send to the UTRAN 20u. Any such occurrence of the above means that the SNs maintained by the RNC 22 of the SRNS 20s are out of synchronization with corresponding SNs maintained by the UE 40, and is herein termed a "next expected UL/DL Receive PDCP sequence number invalidity event". A PDCP sequence number synchronization procedure is thus enacted by the TRNS 20t, or by the UE 40, depending upon which device detects the next expected UL/DL Receive PDCP sequence number invalidity event. During the PDCP sequence number synchronization procedure (and assuming for the sake of example that it is the TRNS 20t that has detected the next expected UL/DL Receive PDCP sequence number invalidity event), the TRNS 20t transmits a PDCP PDU that explicitly containsits associated SN in its PDCP header, with the data region of this PDCP PDU corresponding to the sequentially earliest forwarded PDCP SDU 28. This PDU is termed a PDCP SeqNum PDU. Once the UE 40 has confirmed this PDCP SeqNum PDU (by way of the RLC layer 72), the TRNS 20t considers the PDCP sequence number synchronization procedure completed.

The primary purpose of having PDCP PDU SNs is to support lossless SRNS relocation, as discussed above. Unsynchronization of PDCP SNs between two PDCP entities (i.e., the UE 40 and the UTRAN 20u) can lead to PDCP PDU loss. The PDCP sequence number synchronization procedure as discussed above avoids such loss. In all cases in the prior art, it is the RRC layer 80, in either the UTRAN 20u or the UE 40, that instructs the PDCP layer 70 to perform the PDCP sequence number synchronization procedure. The prior art notes three cases in which the RRC layer 80 should cause a PDCP sequence number synchronization procedure to occur:

1) During an RLC reset procedure.

2) During a Radio Bearer reconfiguration procedure.

3) During a lossless SRNS relocation when a next expected UL/DL Receive PDCP sequence number invalidity event is detected between the sequence numbers of the two PDCP entities.

Under certain conditions, the Radio Bearer reconfiguration procedure will not lead to loss of PDCP PDUs. Nevertheless, the prior art protocol insists that a PDCP sequence number synchronization procedure be performed. This is a waste of radio resources, as it forces the unnecessary inclusion of the 16-bit PDCP sequence number into the transmitted PDCP PDUs. Secondly, when the Radio Bearer reconfiguration procedure is combined with the SRNS Relocation procedure, the prior art further insists that the PDCP sequence number synchronization procedure be performed, even if no next expected UL/DL Receive PDCP sequence number invalidity event has been detected. Again, this wastes radio resources. Finally, there are other RRC procedures besides the Radio Bearer reconfiguration procedure that can lead to loss of PDCP PDUs, and which are unaccounted for in the prior art. This can undermine the entire lossless SRNS Relocation procedure of the prior art, if these RRC procedures are not performed in combination with an SRNS Relocation procedure.

SUMMARY OF INVENTION

It is therefore a primary objective of this invention to provide a method for determining when a PDCP sequence number synchronization procedure should be performed.

Briefly summarized, the preferred embodiment of the present invention considers RRC procedures that can be combined with an SRNS Relocation procedure, and which can potentially lead to the loss of PDCP PDUs. These procedures include Transport Channel Reconfiguration, Radio Bearer Setup, Radio Bearer Release, and Cell Update procedures. Further, each of these RRC procedures is capable of causing the RLC peer entities associated with the PDCP peer entities to be re-established. When the RRC procedures are combined with the SRNS Relocation procedure, a PDCP synchronization procedure is performed only if a next expected UL/DL Receive PDCP sequence number invalidity event is detected during the SRNS Relocation procedure. If no next expected UL/DL Receive PDCP sequence number invalidity event is detected, then no PDCP sequence number synchronization procedure is performed. If the RRC procedures are not executed in combination with the SRNS Relocation procedure, then the PDCP sequence number synchronization procedure is performed under the following cases:

1) The RRC procedure causes the RLC entity that is used by the PDCP entity to be re-established. Or, 2) The RRC procedure causes the header compression protocol used by the PDCP entity to be changed.

It is an advantage of the present invention that by only performing the PDCP sequence number synchronization procedure when a next expected UL/DL Receive PDCP sequence number invalidity event is detected during an SRNS Relocation procedure, unnecessary inclusion of the 16-bit PDCP sequence numbers into the PDCP PDUs is avoided, thereby reducing the amount of data that needs to be transmitted for each PDCP SDU, and thus increasing the bandwidth utilization efficiency. Similarly, when the RRC procedures are performed alone and not in combination with an SRNS Relocation procedure, by only performing the PDCP sequence number synchronization procedure when the RRC procedure has possibly caused loss of PDCP PDUs, unnecessary executions of the PDCP sequence number synchronization procedure are avoided, thus increasing the bandwidth utilization efficiency. Finally, by considering all RRC procedures that can potentially lead to loss of PDCP PDUs, the present invention better ensures that a lossless SRNS Relocation procedure can be performed.

These and other objectives of the present invention will no doubt become obvious to those of ordinary skill in the art after reading the following detailed description of the preferred embodiment, which is illustrated in the various figures and drawings.

DETAILED DESCRIPTION

In the following description, user equipment (UE) may be a mobile telephone, a handheld transceiver, a personal data assistant (PDA), a computer, or any other device that requires a wireless exchange of data. It is assumed that this wireless exchange of data conforms to 3GPP-specified protocols. It should be understood that many means may be used for the physical layer to effect wireless transmissions, and that any such means may be used for the system hereinafter disclosed.

Figure 1:
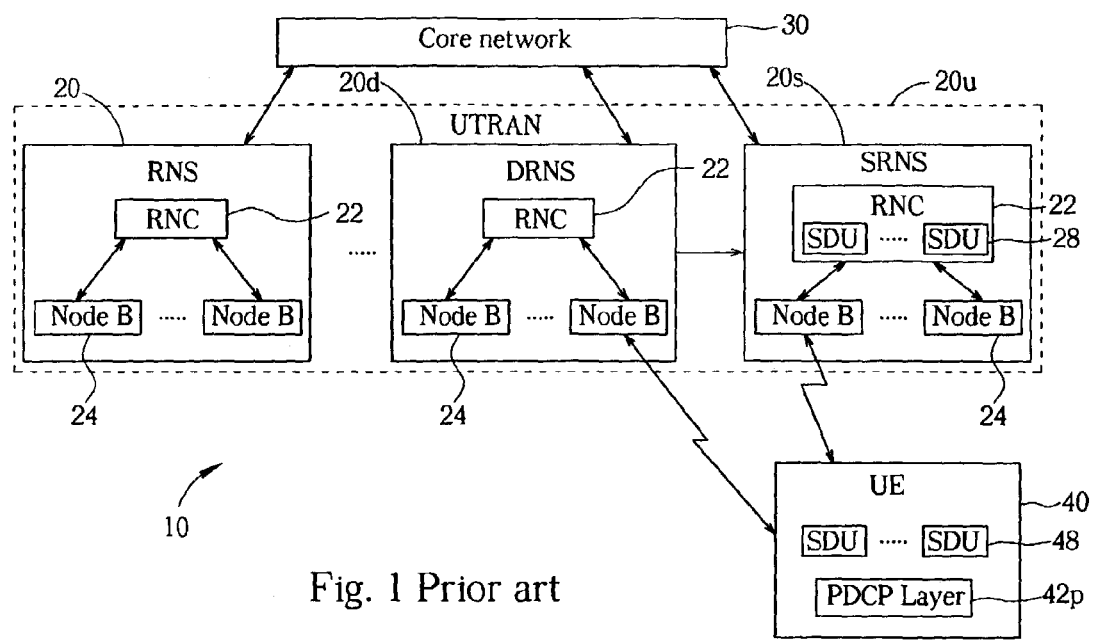
FIG. 1 is a block diagram of a wireless communications system.
Figure 2:
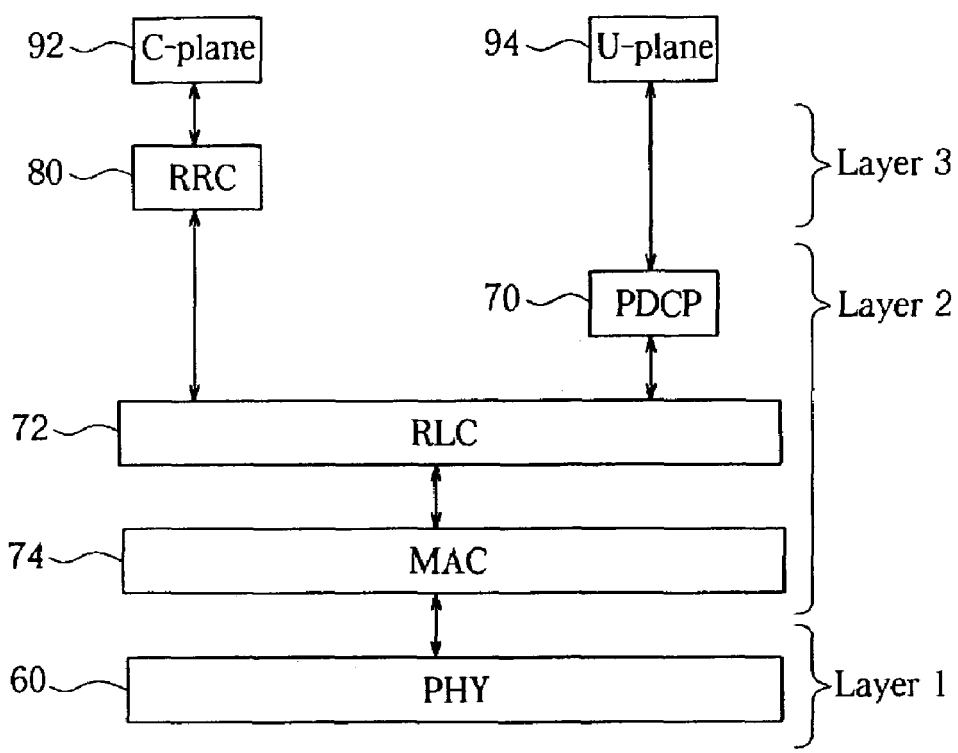
FIG. 2 is a simple block diagram of a UMTS radio interface protocol architecture.
Figure 3:
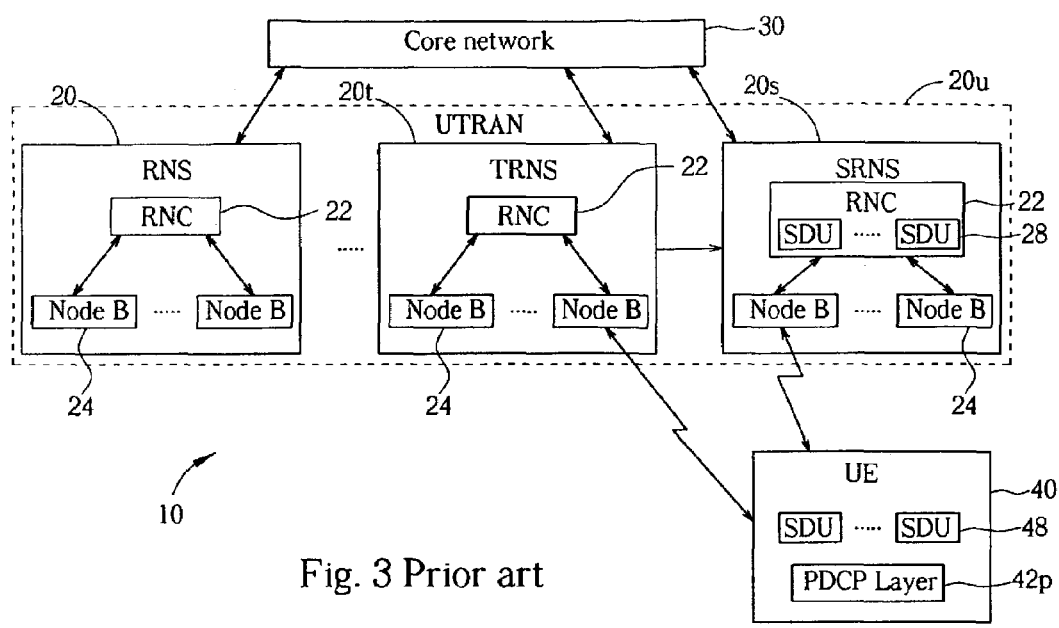
FIG. 3 is a block diagram of a mobile unit of FIG. 1 undergoing a lossless SRNS relocation procedure.
Figure 4:
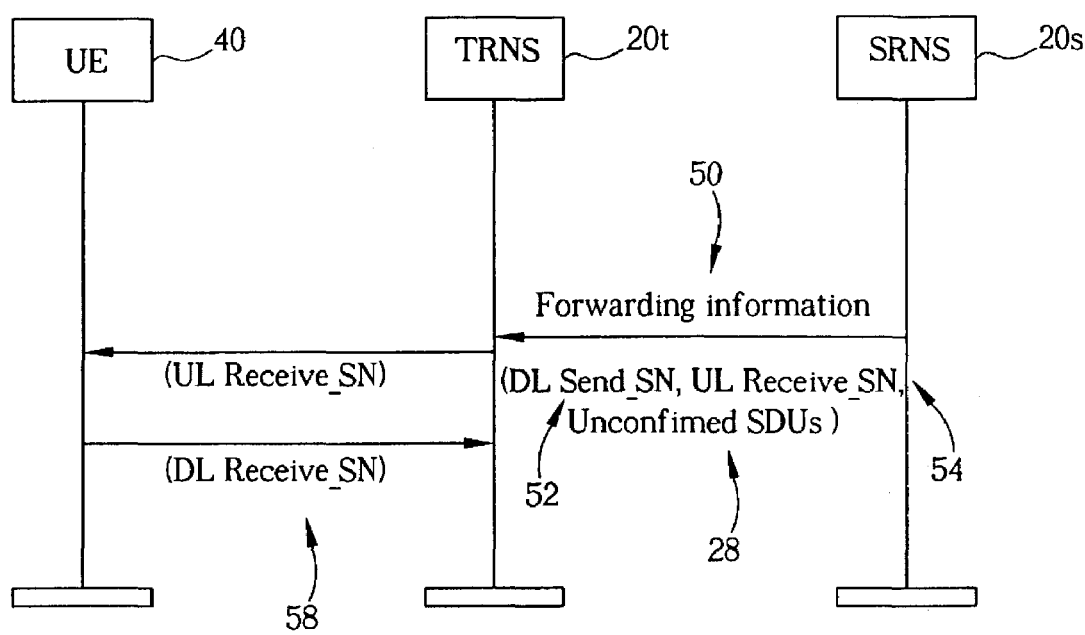
FIG. 4 is a message sequence chart for a prior art lossless SRNS relocation procedure.
Figure 5:
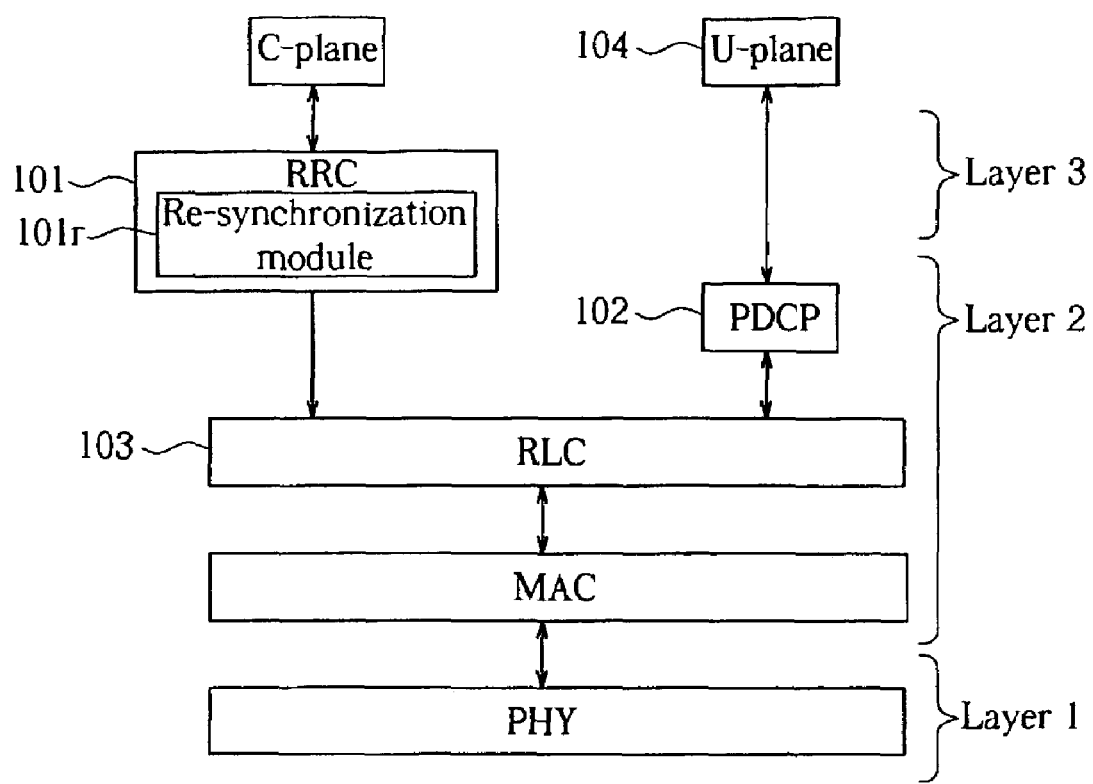
FIG. 5 is a simple block diagram of a UMTS radio interface protocol architecture according to the present invention.

Please refer to FIG. 5. FIG. 5 is a simple block diagram of a UMTS radio interface protocol architecture according to the present invention. The basic structure of the present invention UMTS radio interface protocol architecture is much like that of the prior art, and is implemented in both the UTRAN and the UE. Specifically, a three-layered interface is provided, with the layer 3 interface including an RRC layer 101.

However, the present invention RRC layer 101 includes a PDCP re-synchronization module 101r that causes the RRC layer 101 to instruct a PDCP layer 102 in the layer 2 interface to perform PDCP sequence number synchronization procedures only when certain specific RRC 101 procedures are performed under specific circumstances. The PDCP re-synchronization module 101r is depicted in FIG. 5 as being part of the RRC layer 101. One skilled in the art, though, should quickly realize that the re-synchronization module 101r may be effectively disposed anywhere within a present invention wireless device, as the re-synchronization module is preferably implemented by way of software. These specific RRC 101 procedures and their related circumstances will be treated in more detail below, but include the following RRC 101 procedures: Transport Channel Reconfiguration, Radio Bearer Setup, Radio Bearer Release, Cell Update, RRC Radio Bearer Reconfiguration, URA Update, and UTRAN mobility information. All of these RRC 101 procedures are characterized in that they can perform, or be combined with, an SRNS relocation procedure. Further, all of these RRC 101 procedures, except for the URA Update and UTRAN Mobility Information procedures, are capable of causing the RLC layer 103 associated with the PDCP layer 102 to be re-established, and hence lead to a potential loss of untransmitted RLC 103 PDUs. These RRC 101 procedures are also capable of causing the PDCP 102 header compression protocol to be changed, which leads to discarding of PDCP 102 PDUs. Thus, all of the RRC 101 procedures are ultimately characterized in that they can potentially lead to a loss of PDCP 102 PDUs.

Each of the above-noted RRC 101 procedures is initiated by passing an associated RRC 101 message between RRC 101 peer entities (i.e., between the RRC 101 of the UE and the corresponding RRC 101 of the UTRAN). The RRC 101 procedures are capable of performing SRNS Relocation by including an information element (IE) in the related RRC 101 message. By including a "new U-RNTI"IE in the Radio Bearer Reconfiguration message, the UTRAN commands the UE to change the SRNS of the UE. If the "new U-RNTI"IE is not included in the Radio Bearer Reconfiguration message, then SRNS Relocation is not performed (i.e. is not combined with the RRC 101 Radio Bearer Reconfiguration procedure). A "Downlink counter synchronization info" IE is included in the other RRC 101 messages (Transport Channel Reconfiguration, Radio Bearer Setup, Radio Bearer Release, Cell Update, URA Update, and UTRAN mobility information) to cause an SRNS Relocation procedure to be performed. If the "Downlink counter synchronization info" IE is not included, SRNS Relocation is not performed.

The re-synchronization module 101r of the present invention considers two conditions under which a PDCP 102 sequence number synchronization procedure should be performed in response to one of the above-noted RRC 101 procedures:

1) The RRC 101 procedure is combined with an SRNS Relocation procedure, and

2) The RRC 101 procedure is performed without an SRNS Relocation procedure being performed.

With regards to the first condition, the re-synchronization module 101r of the present invention instructs the PDCP entity 102 to perform a PDCP 102 sequence number synchronization procedure if a next expected UL/DL Receive PDCP sequence number invalidity event is detected during the SRNS Relocation procedure. Otherwise, no PDCP 102 sequence number synchronization procedure is performed. With regards to the second condition, the re-synchronization module 101r instructs the PDCP entity 102 to perform a PDCP 102 sequence number synchronization procedure only if the RLC entity 103 of the PDCP entity 102 is re-established due to the RRC 101 procedure, or if the PDCP 102 header compression protocol is caused to be changed by the RRC 101 procedure. In general, the RLC entity 103 is re-established when the RLC 103 PDU size is changed by the RRC 101 procedure.

In all of the following simplified message sequence charts, it should be noted that the RRC 101 procedures covered by the present invention, both in and out of combination with an SRNS Relocation procedure, are quite complicated and involve large amounts of signaling. Consequently, the following simplified message sequence charts are presented with blocks that represent large sections of signaling that are identical to the prior art, the details of which are not of direct relevance to the present invention. The following simplified message sequence charts are intended to present to one reasonably skilled in the art of 3GPP communications protocols the pertinent aspects of the present invention without undue complexity.

Figure 6:
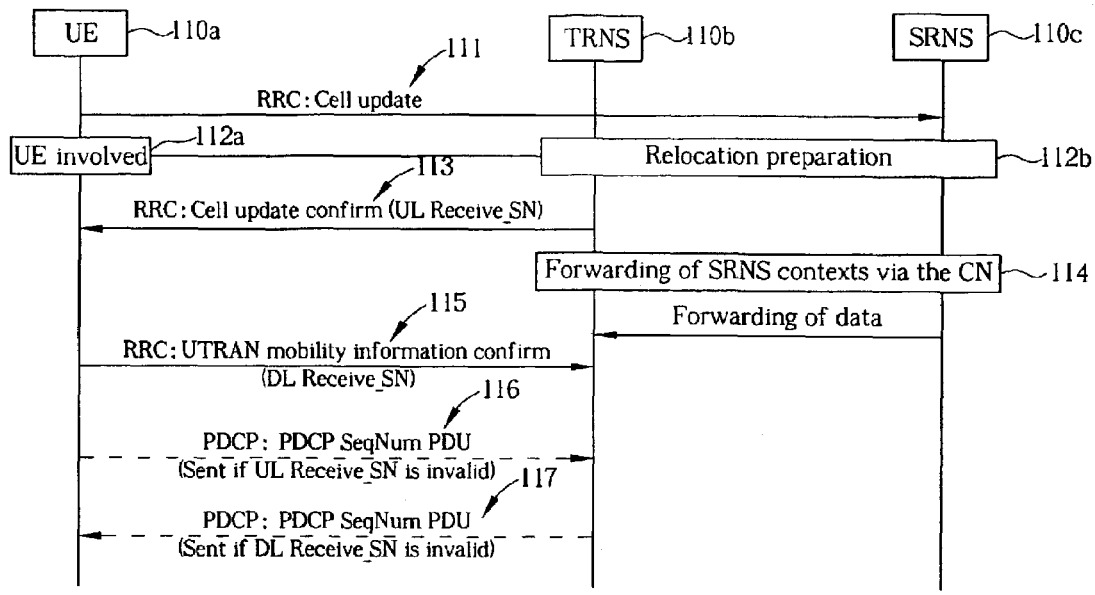
FIG. 6 is a simplified message sequence chart for performing an RRC Cell Update procedure in combination with an SRNS Relocation procedure according to the present invention.

Please refer to FIG. 6 with reference to FIG. 5. FIG. 6 is a simplified message sequence chart for performing an RRC 101 Cell Update procedure in combination with an SRNS Relocation procedure according to the present invention. The Cell Update procedure is performed when a UE 110a moves into another cell region, and is used to update the location of the UE 110a. Amongst other things, the RRC 101 Cell Update procedure is also used to notify the UTRAN of an unrecoverable error in an AM RLC 103 entity, to update the UTRAN of the current cell the UE 110a is camping on after cell reselection, and to act upon a radio link failure. Furthermore, the Cell Update procedure may be combined with a re-establishment procedure for an AM RLC 103 entity, and RRC 101 Radio Bearer Release, Radio Bearer Reconfiguration, Transport Channel Reconfiguration or Physical Channel Reconfiguration procedures. The UE 110a initiates the RRC 101 Cell Update procedure by sending a Cell Update message 111 to its RRC 101 peer entity on an SRNS 110c. SRNS 110c determines if the UE 110a needs to be managed by another RNS, and thus if an SRNS Relocation procedure needs to be performed. Within blocks 112a and 112b, signals are passed between the UE 110a, SRNS 110c and a TRNS 110b to begin the SRNS Relocation procedure. A Cell Update Confirm message 113 is then sent by the RRC 101 of the TRNS 110b to the corresponding peer entity RRC 101 on the UE 110a, completing the Cell Update procedure. The Cell Update Confirm message 113 contains a UL Receive_SN value, which the re-synchronization module 101r on the UE 110a utilizes. The Cell Update Confirm message 113 contains a "Downlink counter synchronization info"IE to inform the UE 110a that an SRNS Relocation procedure is being performed. SRNS contexts are forwarded by the SRNS 110c to the TRNS 110b within block 114, followed by the forwarding of PDCP SDU data. The RRC 101 of the UE 110a then sends a UTRAN Mobility Information Confirm message 115, or another suitable confirmation message, to the RRC 101 peer entity on the TRNS 110b, which contains a DL Receive_SN value. The DL Receive_SN value is used by the re-synchronization module 101r on the TRNS 110b. Finally, only if the UL Receive_SN value is determined by the re-synchronization module 101r of the UE 110a to be invalid, i.e., that the re-synchronization module 101r detects that a next expected UL/DL Receive PDCP sequence number invalidity event has occurred, does the re-synchronization module 101r of the UE 110a then instruct the PDCP layer 102 to perform a PDCP 102 sequence number synchronization procedure. In this case, the PDCP layer 102 of the UE 110a sends a PDCP SeqNum PDU 116 to its peer entity PDCP layer 102 on the TRNS 110b. Otherwise, if no next expected UL/DL Receive PDCP sequence number invalidity event is detected by the UE 110a re-synchronization module 101r, then the PDCP peer entity 102 on the UE 110a does not send the PDCP SeqNum PDU 116. The above process is performed for all radio bearers that are configured to support lossless SRNS Relocation. Similarly, only if the DL Receive_SN value (as obtained from the UE 110a) is determined by the re-synchronization module 101r of the TRNS 110b to be invalid, i.e., that the re-synchronization module 101r detects that a next expected UL/DL Receive PDCP sequence number invalidity event has occurred, does the re-synchronization module 101r of the TRNS 110b instruct the PDCP layer 102 to perform a PDCP 102 sequence number synchronization procedure, which causes the PDCP layer 102 of the TRNS 110b to send a PDCP SeqNum PDU 117 to its peer entity PDCP layer 102 on the UE 110a. Otherwise, if no next expected UL/DL Receive PDCP sequence number invalidity event is detected by the TRNS 110b re-synchronization module 101r, then the PDCP peer entity 102 on the TRNS 110b does not send the PDCP SeqNum PDU 117. As with the UE 110a, the above process is performed for all radio bearers that are configured to support lossless SRNS Relocation.

Figure 7:
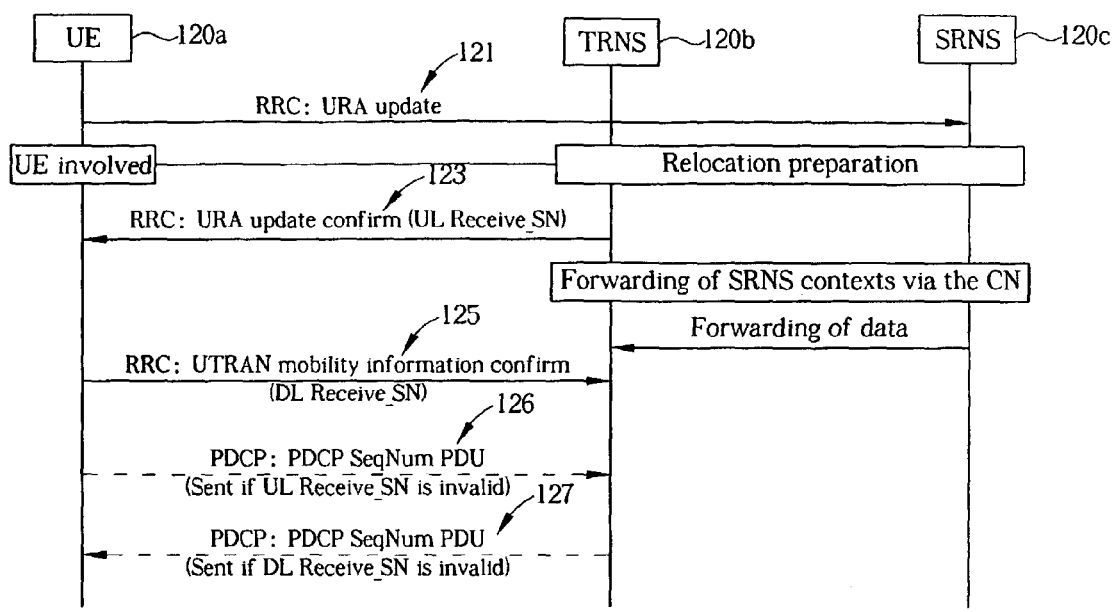
FIG. 7 is a simplified message sequence chart for performing an RRC URA Update procedure in combination with an SRNS Relocation procedure according to the present invention.

Please refer to FIG. 7 with reference to FIG. 5. FIG. 7 is a simplified message sequence chart for performing an RRC 101 URA Update procedure in combination with an SRNS Relocation procedure according to the present invention. The URA Update procedure is similar to the Cell Update procedure, and is used to inform the UTRAN that its UTRAN Registration Area (URA), which consists of several cells, has changed. From the point of view of the present invention, the URA Update procedure is nearly identical to the Cell Update procedure as presented in FIG. 6. Briefly, then, the RRC 101 URA Update procedure is initiated by a UE 120a sending a URA Update message 121 to its peer entity RRC 101 on an SRNS 120c. The URA Update message 121 contains an IE that causes SRNS Relocation to be performed. A TRNS 120b completes the URA Update procedure by sending a URA Update confirm message 123 to the RRC entity 101 on the UE 120a. The URA Update Confirm message contains a UL Receive_SN value. Various SRNS Relocation-relate signaling processes occur, and finally the RRC 101 of the UE 120a sends a UTRAN Mobility Information Confirm message 125 to the TRNS 120b, which contains a DL Receive_SN value. The re-synchronization modules 101r of the UE 120a and the TRNS 120b then respectively utilize the UL Receive_SN value and the DL Receive_SN value to determine if they should cause their respective PDCP peers 102 to perform a PDCP 102 sequence number synchronization procedure. A PDCP SeqNum PDU 126 is sent by the PDCP layer 102 of the UE 120a only if a next expected UL/DL Receive PDCP sequence number invalidity event is detected by the re-synchronization module 101r of the UE 120a. Similarly, a PDCP SeqNum PDU 127 is sent by the PDCP layer 102 of the TRNS 120b only if a next expected UL/DL Receive PDCP sequence number invalidity event is detected by the re-synchronization module 101r of the TRNS 120b. The above process is performed for all radio bearers that are configured to support lossless SRNS Relocation.

Figure 8:
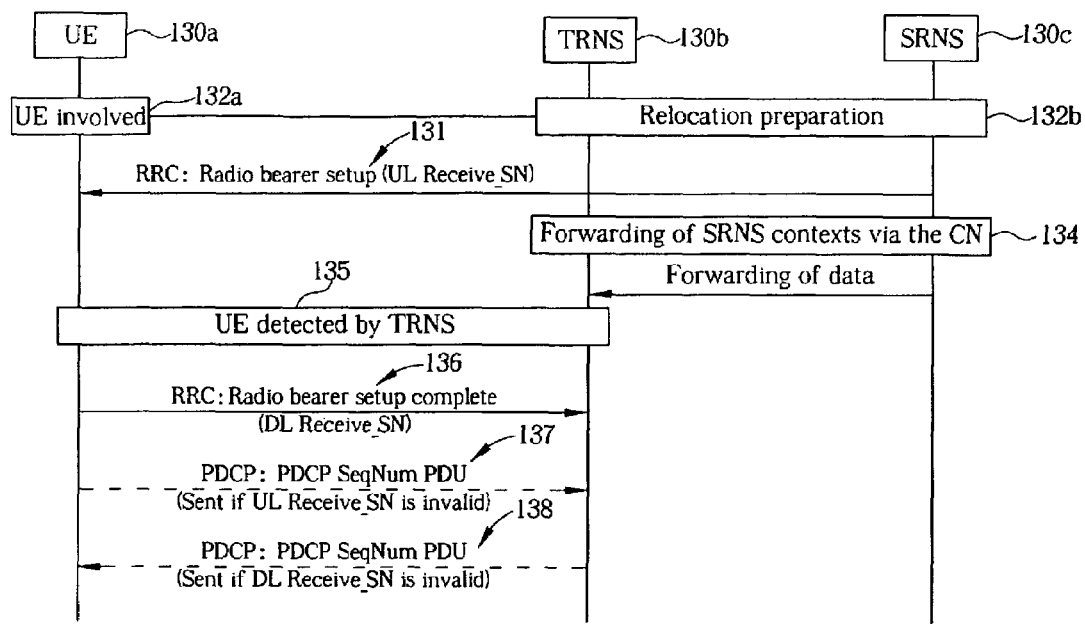
FIG. 8 is a simplified message sequence chart for performing an RRC Radio Bearer Setup procedure in combination with an SRNS Relocation procedure according to the present invention.

Please refer to FIG. 8 with reference to FIG. 5. FIG. 8 is a simplified message sequence chart for performing an RRC 101 Radio Bearer Setup procedure in combination with an SRNS Relocation procedure according to the present invention. Initial signaling related to SRNS Relocation is performed between a UE 130a, a TRNS 130b and an SRNS 130c, as indicated by boxes 132a and 132b. The RRC layer 101 of the SRNS 130c then sends a standard Radio Bearer Setup message 131 to the UE 110a. The Radio Bearer Setup procedure establishes a new radio bearer for transmission and reception of user data, i.e., transmission along the U-plane 104. The radio bearer establishment is based on Quality of Service (QoS), and performs assignment of RLC 103 parameters, multiplexing priority for the Dedicated Traffic Channel (DTCH), Common Packet Channel (CPCH) Set assignment, the scheduling priority for the Dedicated Channel (DCH), Transport Format Set (TFS) for the DCH, and updating of the Transport Format Combination Set (TFCS). The Radio Bearer Setup procedure may also include reconfiguration of radio bearers (e.g. the assignment of a physical channel, and changing of the used transport channel types/RRC 101 state).Note that if the SRNS 130c only reconfigures radio bearers, then the SRNS 130c normally uses the RRC 101 Radio Bearer Reconfiguration procedure. The Radio Bearer Setup message 131 contains an IE that causes SRNS Relocation to be performed, and also contains a UL Receive_SN value, which is subsequently utilized by the re-synchronization module 101r on the UE 130a. More SRNS Relocation-related signaling is performed, as indicated by box 134, culminating in the forwarding of PDCP SDU data from the SRNS 130c to the TRNS 130b. Signaling related to detection of the UE 130a by the TRNS 130b is performed, as indicated by box 135, and finally the RRC layer 101 of the UE 130a completes the Radio Bearer Setup procedure by sending a Radio Bearer Setup Complete message 136 to its RRC peer entity 101 on the TRNS 130b. The Radio Bearer Setup Complete message 136 contains a UL Receive_SN value, which is subsequently utilized by the re-synchronization module 101r on the TRNS 130b. A PDCP SeqNum PDU 137 is sent by the PDCP layer 102 of the UE 130a only if a next expected UL/DL Receive PDCP sequence number invalidity event is detected by the re-synchronization module 101r of the UE 130a. Similarly, a PDCP SeqNum PDU 138 is sent by the PDCP layer 102 of the TRNS 120b only if a next expected UL/DL Receive PDCP sequence number invalidity event is detected by the re-synchronization module 101r of the TRNS 130b. The re-synchronization modules 101r cause the PDCP 102 sequence number synchronization procedure to be performed (i.e., the sending of the PDCP SeqNum PDUs 137 and 138) on PDCP 102 peer entities belonging to radio bearers configured to support lossless SRNS Relocation, and which existed before performing the Radio Bearer Setup procedure.

Figure 9:
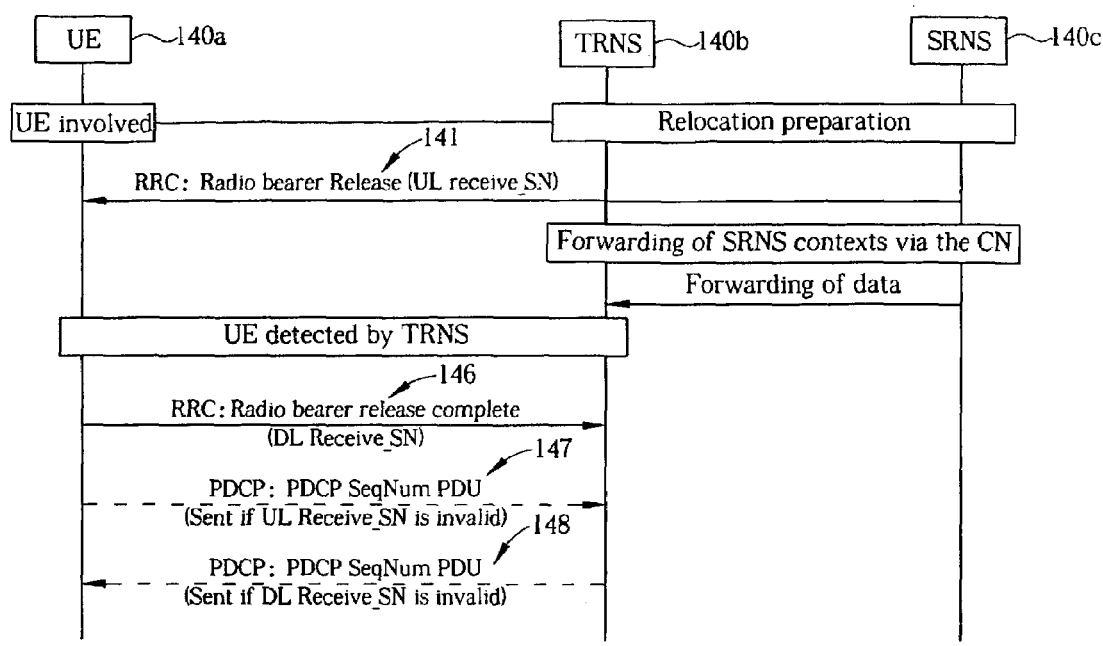
FIG. 9 is a simplified message sequence chart for performing an RRC Radio Bearer Release procedure in combination with an SRNS Relocation procedure according to the present invention.

Please refer to FIG. 9 with reference to FIG. 5. FIG. 9 is a simplified message sequence chart for performing an RRC 101 Radio Bearer Release procedure in combination with an SRNS Relocation procedure according to the present invention. This RRC 101 procedure releases a radio bearer. The RLC entity 103 for the radio bearer is thus released as well. The procedure may also release a DCH, which affects the TFCS. It may include release of a physical channel or channels. It may also include reconfiguration of radio bearers (e.g. changing the used transport channel types/RRC 101 state). From the standpoint of the present invention, the process as performed in FIG. 9 is nearly identical to that of FIG. 8, except that it is performed in the context of a Radio Bearer Release message 141, rather than the Radio Bearer Setup message 131, and should be clear from FIG. 9 to one reasonably skilled in the art. The UL Receive_SN value is carried in the initial Radio Bearer Release message 141 to a UE 140a from an SRNS 140c. The DL Receive_SN value is carried in a Radio Bearer Release Complete message 146 to a TRNS 140b from the UE 140a. The re-synchronization modules 101r on the UE 140a and TRNS 140b then respectively use the UL Receive_SN value and the DL Receive_SN value to determine if a next expected UL/DL Receive PDCP sequence number invalidity event has occurred, and hence if a PDCP 102 sequence number synchronization procedure should be performed by respectively sending a PDCP SeqNum PDU 147 or 148. As before, PDCP 102 sequence number synchronization procedures are only performed if a corresponding next expected UL/DL Receive PDCP sequence number invalidity event is detected. If performed, the PDCP sequence number synchronization procedure is performed on PDCP 102 peer entities belonging to radio bearers configured to support lossless SRNS Relocation that have not been released.

Figure 10:
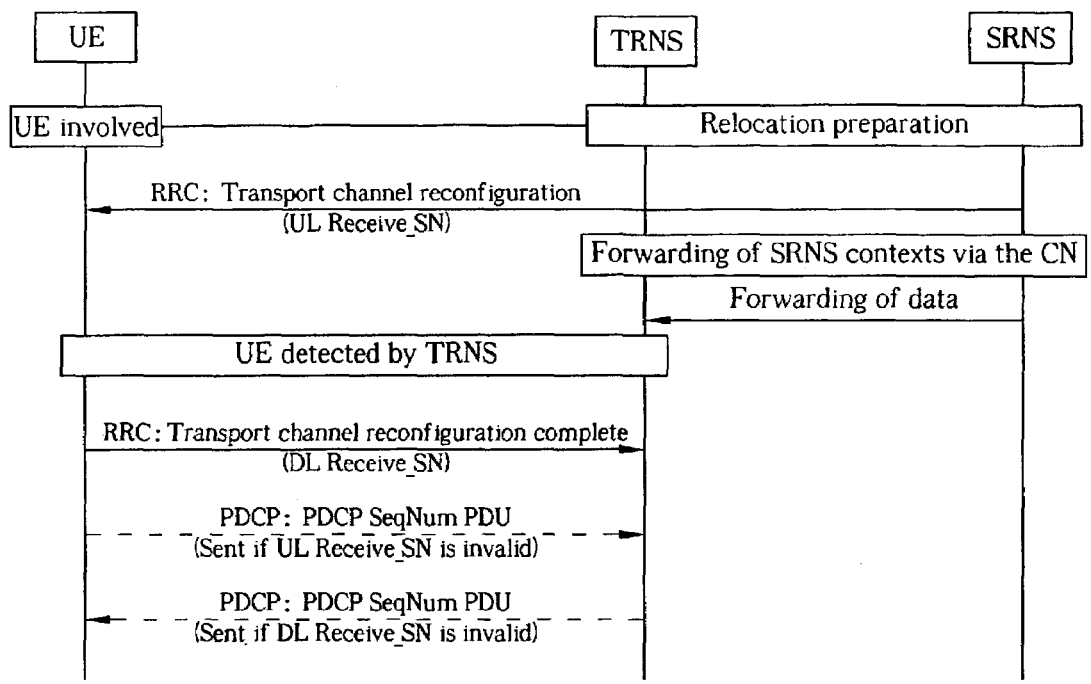
FIG. 10 is a message sequence chart for performing an RRC Transport Channel Reconfiguration procedure in combination with an SRNS Relocation procedure according to the present invention.

Please refer to FIG. 10 with reference to FIG. 5. FIG. 10 is a message sequence chart for performing an RRC 101 Transport Channel Reconfiguration procedure in combination with an SRNS Relocation procedure according to the present invention. This RRC 101 procedure reconfigures parameters related to a transport channel, such as the TFS. The procedure also assigns a TFCS and may change physical channel parameters to reflect a reconfiguration of a transport channel in use. With respect to the present invention, the procedure is nearly identical to those of FIGS. 8 and 9, and should be clear from FIG. 10. PDCP 102 sequence number synchronization, if performed, is performed for PDCP 102 peer entities belonging to radio bearers configured to support lossless SRNS Relocation.

Figure 11:
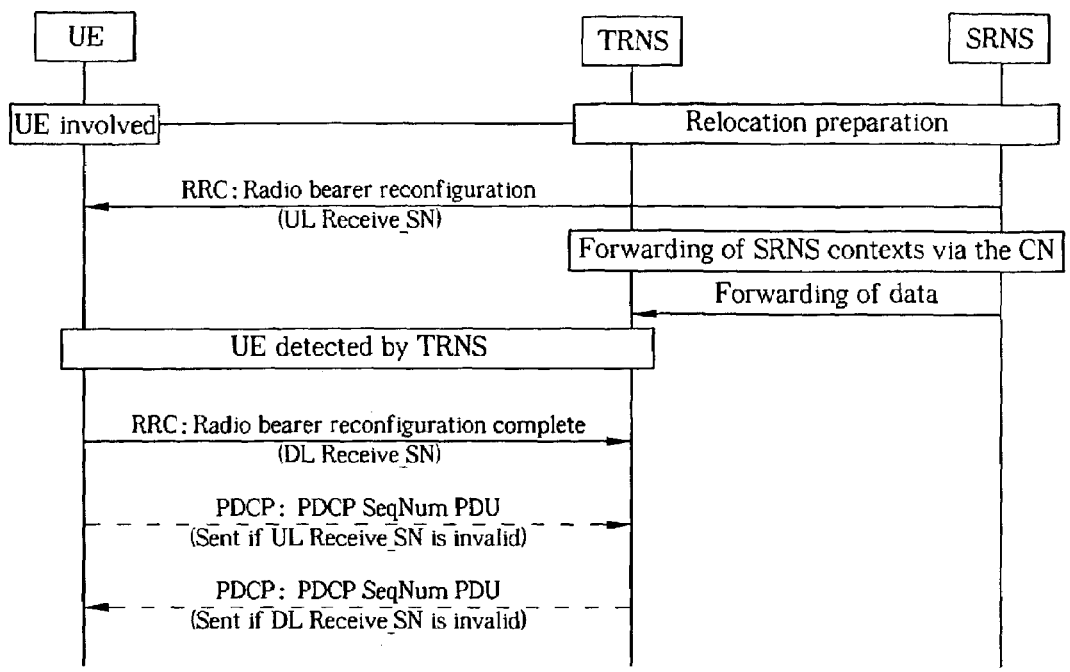
FIG. 11 is a message sequence chart for performing an RRC Radio Bearer Reconfiguration procedure in combination with an SRNS Relocation procedure according to the present invention.

Please refer to FIG. 11 with reference to FIG. 5. FIG. 11 is a message sequence chart for performing an RRC 101 Radio Bearer Reconfiguration procedure in combination with an SRNS Relocation procedure according to the present invention. This RRC 101 procedure reconfigures parameters for a radio bearer (e.g. the signaling link) to reflect changes in QoS. It may include change of RLC 103 parameters, change of multiplexing priority for DTCH/DCCH, CPCH Set assignment, change of DCH scheduling priority, change of TFS for DCH, change of TFCD, assignment or release of physical channel or channels, and change of used transport channel types. With respect to the present invention, the procedure is nearly identical to those of FIGS. 8, 9 and 10, and should be clear from FIG. 11. PDCP 102 sequence number synchronization, if performed, is performed for PDCP 102 peer entities belonging to radio bearers configured to support lossless SRNS Relocation.

Figure 12:
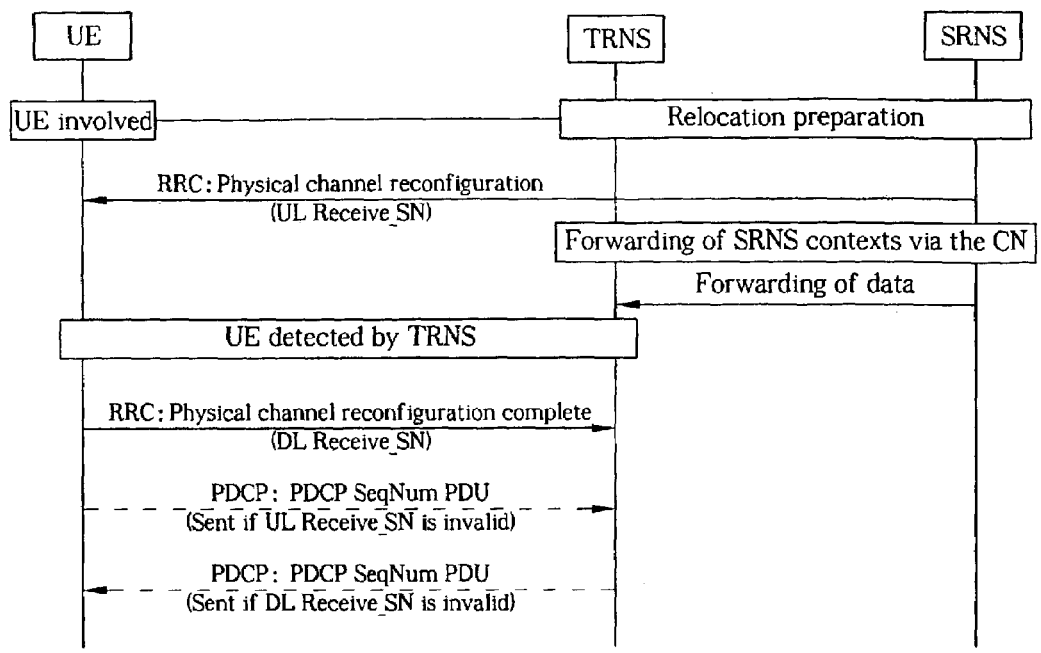
FIG. 12 is a message sequence chart for performing an RRC Physical Channel Reconfiguration procedure in combination with an SRNS Relocation procedure according to the present invention.

Please refer to FIG. 12 with reference to FIG. 5. FIG. 12 is a message sequence chart for performing an RRC 101 Physical Channel Reconfiguration procedure in combination with an SRNS Relocation procedure according to the present invention. The Physical Channel Reconfiguration procedure is similar to other reconfiguration (Radio Bearer Reconfiguration, Transport Channel Reconfiguration) procedures, and is used to establish, reconfigure, and release physical channels. With respect to the present invention, the Physical Channel Reconfiguration procedure is nearly identical to those of FIGS. 8-11, and should be clear from FIG. 12. PDCP 102 sequence number synchronization, if performed, is performed for PDCP 102 peer entities belonging to radio bearers configured to support lossless SRNS Relocation.

Figure 13:
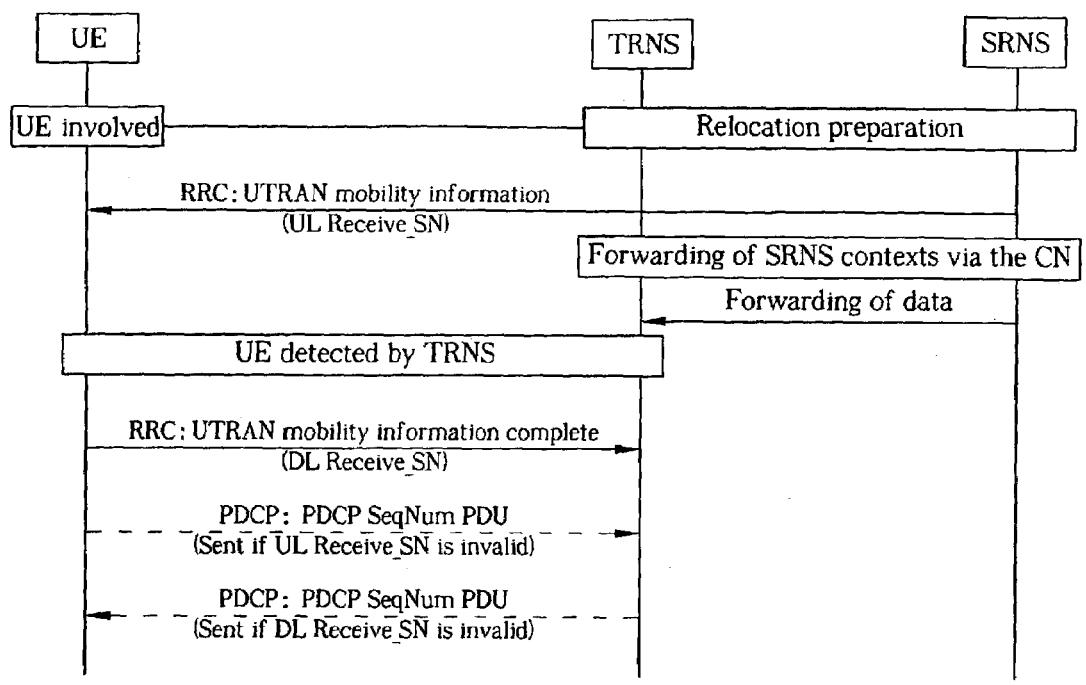
FIG. 13 is a message sequence chart for performing an RRC UTRAN Mobility Information procedure in combination with an SRNS Relocation procedure according to the present invention.

Please refer to FIG. 13 with reference to FIG. 5. FIG. 13 is a message sequence chart for performing an RRC 101 UTRAN Mobility Information procedure in combination with an SRNS Relocation procedure according to the present invention. The UTRAN Mobility Information procedure is used to allocate any one or a combination of a new C-RNTI, a new URNTI, and provide other mobility related information. With respect to the present invention, the procedure is nearly identical to those of FIGS. 8-12, and should be clear from FIG. 13. PDCP 102 sequence number synchronization, if performed, is performed for PDCP 102 peer entities belonging to radio bearers configured to support lossless SRNS Relocation.

Figure 14:
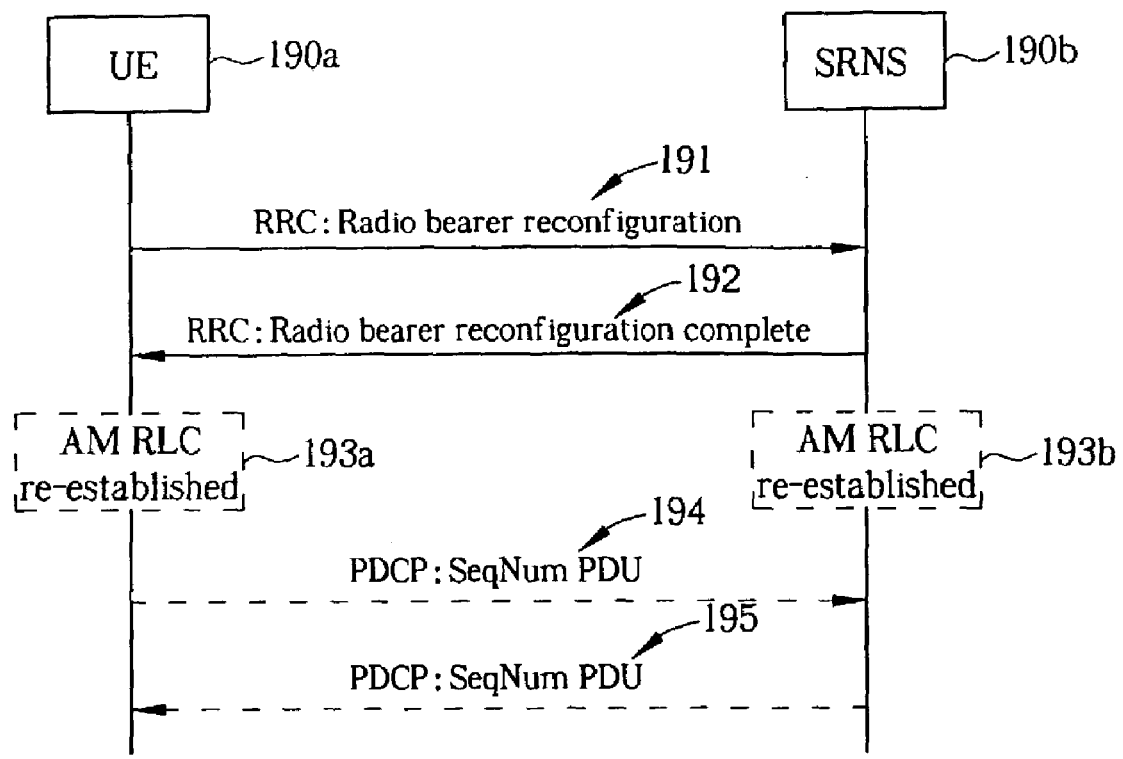
FIG. 14 is a first simplified message sequence chart according to the present invention for performing an RRC Radio Bearer Reconfiguration procedure without performing an SRNS Relocation procedure.

Please refer to FIG. 14 with reference to FIG. 5. FIG. 14 is a first simplified message sequence chart according to the present invention for performing an RRC 101 Radio Bearer Reconfiguration procedure without performing an SRNS Relocation procedure. The RRC layer 101 on an SRNS 190b sends a standard Radio Bearer Reconfiguration message 191 to a UE 190a. The RRC 101 of the UE 190a responds with a standard Radio Bearer Reconfiguration Complete message 192. If, for example, the Radio Bearer Reconfiguration message 191 contains an IE about the RLC 103 PDU size, then the peer entity RLC layers 103 on the UE 190a and SRNS 190b will be re-established, as indicated by the dotted boxes 193a and 193b. When the peer entity RLC layers 103 are re-established, any RLC 103 PDUs that are still in the RLC 103 transmission buffers are discarded, thus causing loss of PDCP 102 PDUs. If the RLC layer 103 of the UE 190a is re-established due to the RRC 101 Radio Bearer Reconfiguration procedure, the re-synchronization module 101r of the UE 190a will cause the PDCP layer 102 of the re-established RLC layer 103 to perform a PDCP 102 sequence number synchronization procedure, thereby resulting in the PDCP layer 102 of the UE 190a sending a PDCP SeqNum PDU 194. This ensures that any lost PDCP 102 PDUs are recaptured. If the UE 190a RLC layer 103 is not re-established (and the PDCP 102 header compression protocol is not changed by the Radio Bearer Reconfiguration procedure), then no PDCP SeqNum PDU 194 is sent to the SRNS 190b. Similarly, if the RLC layer 103 of the SRNS 190b is re-established due to the RRC 101 Radio Bearer Reconfiguration procedure, the re-synchronization module 101r of the SRNS 190b will cause the PDCP layer 102 of the re-established RLC layer 103 to perform a PDCP 102 sequence number synchronization procedure, thereby resulting in the PDCP layer 102 of the SRNS 190b sending a PDCP SeqNum PDU 195, and so ensuring recapture of any lost PDCP 102 PDUs. If the SRNS 190b RLC layer 103 is not re-established (and the PDCP 102 header compression protocol is not changed by the Radio Bearer Reconfiguration procedure), then the re-synchronization module 101r does not force a PDCP 102 sequence number synchronization procedure, and so no PDCP SeqNum PDU 195 is sent to the UE 190a.

Figure 15:
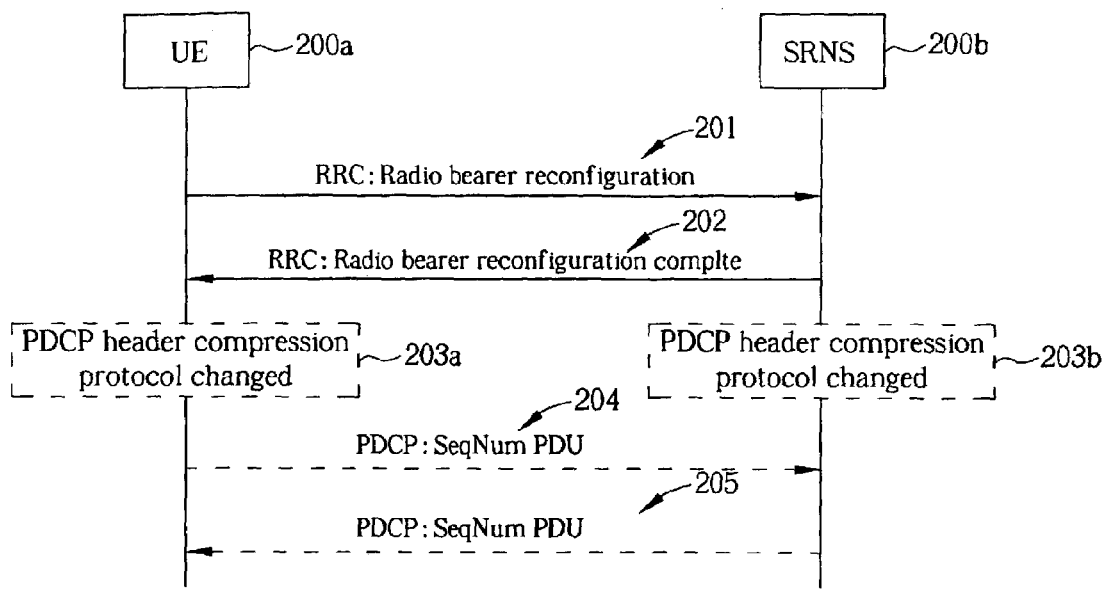
FIG. 15 is a second simplified message sequence chart according to the present invention for performing an RRC Radio Bearer Reconfiguration procedure without performing an SRNS Relocation procedure.

Please refer to FIG. 15 with reference to FIG. 5. FIG. 15 is a second simplified message sequence chart according to the present invention for performing an RRC 101 Radio Bearer Reconfiguration procedure without performing an SRNS Relocation procedure. The RRC layer 101 on an SRNS 200b sends a standard Radio Bearer Reconfiguration message 201 to a UE 200a. The RRC 101 of the UE 200a responds with a standard Radio Bearer Reconfiguration Complete message 202. If, for example, the Radio Bearer Reconfiguration message 201 contains an IE about the PDCP 102 header compression protocol, then the peer entity PDCP layers 102 on the UE 200a and SRNS 200b will change their PDCP 102 header compression protocols, as indicated by the dotted boxes 203a and 203b. When the PDCP 102 header compression protocol is changed, PDCP 102 PDUs that used the old header compression protocol are discarded. If the PDCP 102 header compression protocol of the UE 200a is changed due to the RRC 101 Radio Bearer Reconfiguration procedure, the re-synchronization module 101r of the UE 200a will cause the PDCP layer 102 whose header compression protocol has changed to perform a PDCP 102 sequence number synchronization procedure, thereby resulting in the PDCP layer 102 of the UE 200a sending a PDCP SeqNum PDU 204, and so recapturing any lost PDCP 102 PDUs. If the UE 200a PDCP 102 header compression protocol is not changed (and the corresponding RLC entity 103 has also not been re-established by the Radio Bearer Reconfiguration procedure, as per FIG. 14), then no PDCP SeqNum PDU 194 is sent to the SRNS 190b. Similarly, if the header compression protocol of the PDCP layer 102 of the SRNS 200b is changed due to the RRC 101 Radio Bearer Reconfiguration procedure, the re-synchronization module 101r of the SRNS 200b will cause the PDCP layer 102 whose header compression protocol has changed to perform a PDCP 102 sequence number synchronization procedure, thereby resulting in the PDCP layer 102 of the SRNS 200b sending a PDCP SeqNum PDU 205. If the header compression protocol of the SRNS 200b PDCP layer 102 is not changed (and if the Radio Bearer Reconfiguration procedure did not cause the RLC entity 103 to be re-established, as per FIG. 14), then the re-synchronization module 101r does not force a PDCP 102 sequence number synchronization procedure, and so no PDCP SeqNum PDU 205 is sent to the UE 200a.

In addition to the RRC 101 Radio Bearer Reconfiguration procedure, the present invention considers additional RRC 101 procedures that can be performed without an SRNS Relocation procedure. In particular, these RRC 101 procedures include the Transport Channel Reconfiguration, Radio Bearer Setup, Radio Bearer Release, and Cell Update procedures. All of these RRC 101 procedures are characterized in that they can cause re-establishment of the RLC 103 peer entities, and can also cause changes to the PDCP 112 header compression protocol. Hence, from the standpoint of the present invention, these RRC 101 procedures can be treated identically to the Radio Bearer Reconfiguration procedure, as described with reference to FIGS. 14 and 15.

Figure 16:
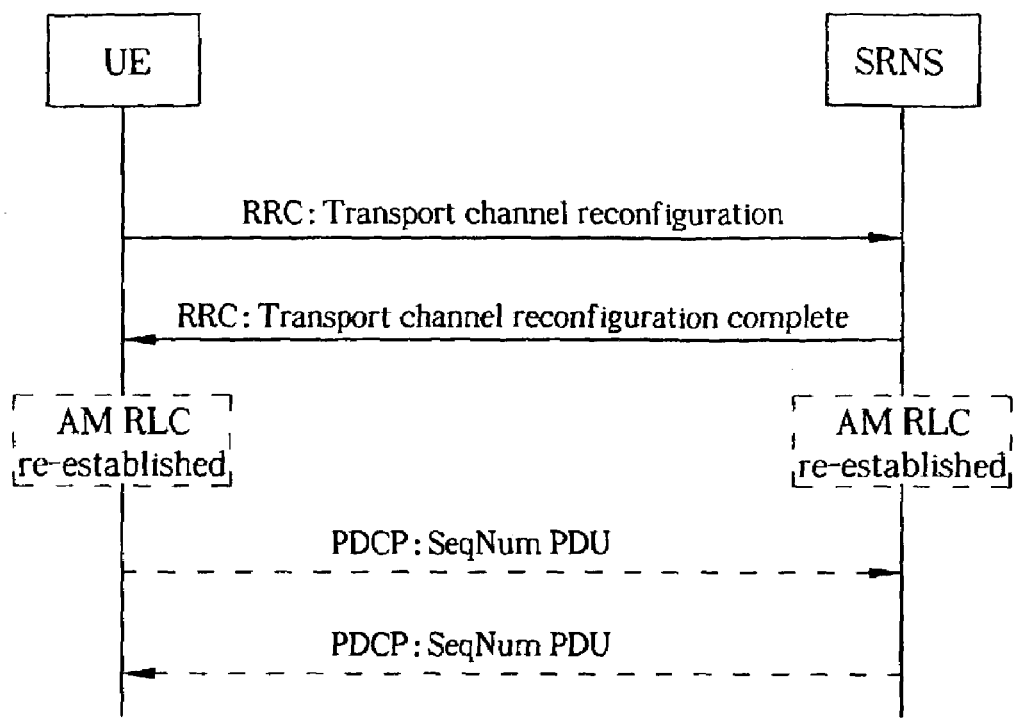
FIG. 16 is a first simplified message sequence chart according to the present invention for performing an RRC Transport Channel Reconfiguration procedure without performing an SRNS Relocation procedure.

With the above in mind, the following figures are presented to illustrate the present invention with regards to these RRC 101 procedures. FIG. 16 is a first simplified message sequence chart according to the present invention for performing an RRC 101 Transport Channel Reconfiguration procedure without performing an SRNS Relocation procedure. As in FIG. 14, if the Transport Channel Reconfiguration procedure causes the RLC 103 peer entities to be re-established, then the re-synchronization modules 101r cause a PDCP 102 sequence number synchronization procedure to be performed. Otherwise, no PDCP 102 sequence number synchronization procedure is performed (assuming that the PDCP 102 header compression protocol is not changed by the Transport Channel Reconfiguration procedure).

Figure 17:
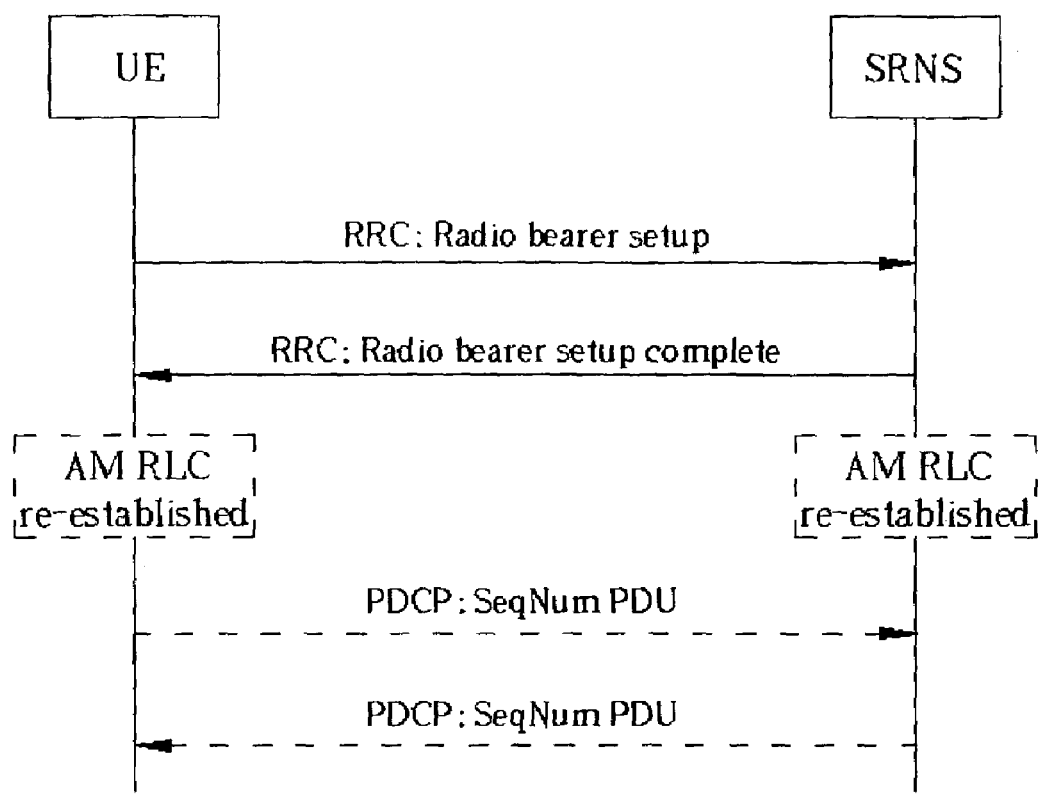
FIG. 17 is a first simplified message sequence chart according to the present invention for performing an RRC Radio Bearer Setup procedure without performing an SRNS Relocation procedure.
Figure 18:
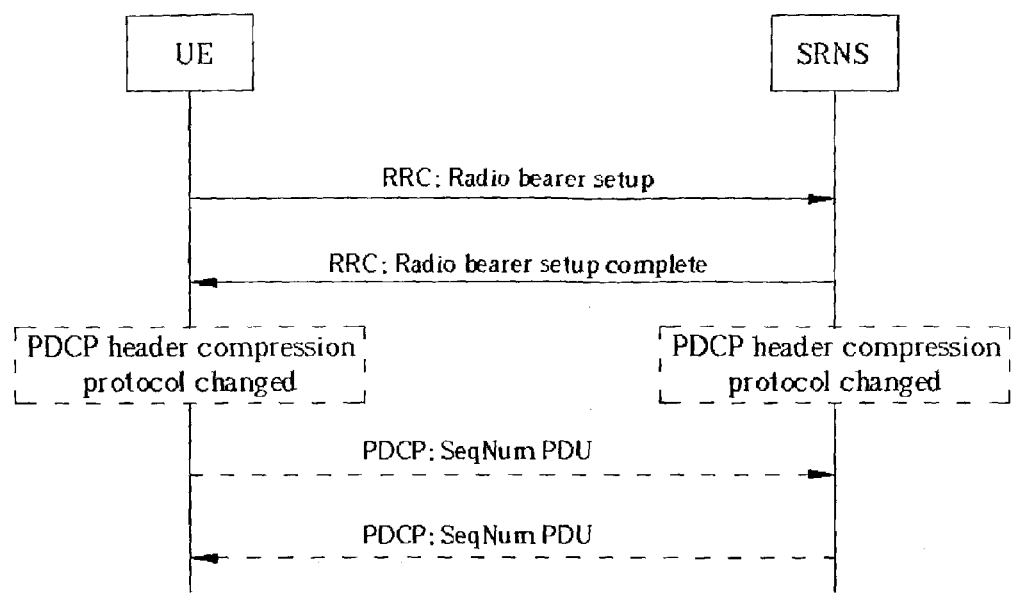
FIG. 18 is a second simplified message sequence chart according to the present invention for performing an RRC Radio Bearer Setup procedure without performing an SRNS Relocation procedure.
Figure 19:
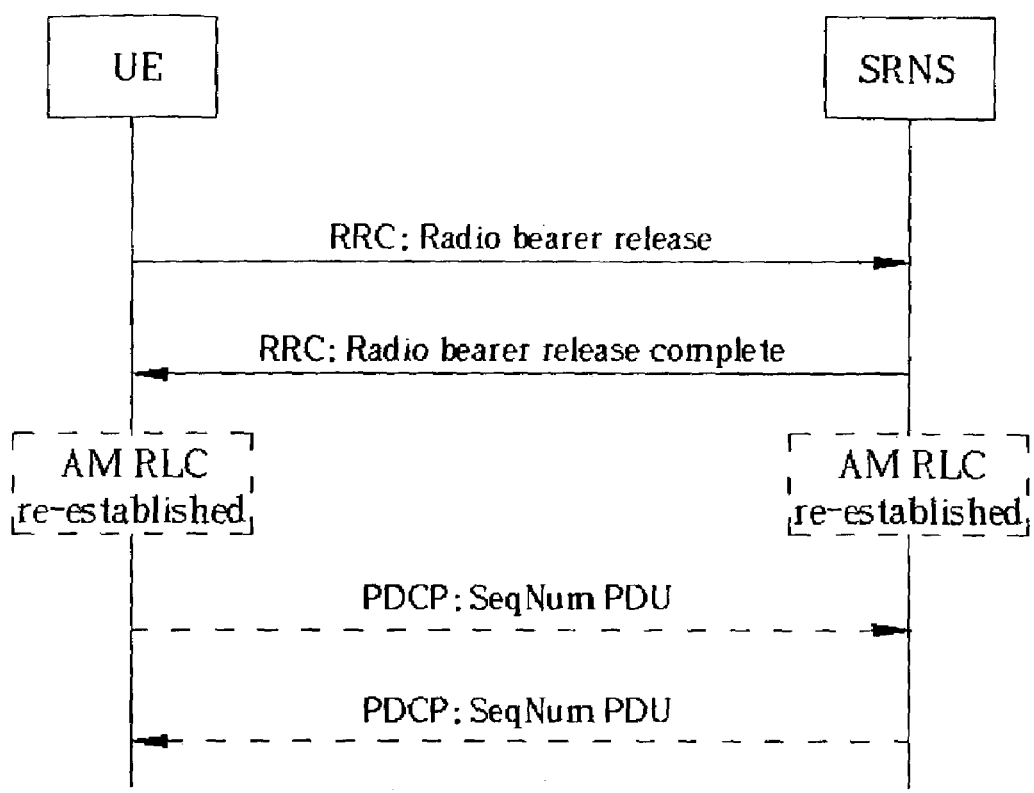
FIG. 19 is a first simplified message sequence chart according to the present invention for performing an RRC Radio Bearer Release procedure without performing an SRNS Relocation procedure.
Figure 20:
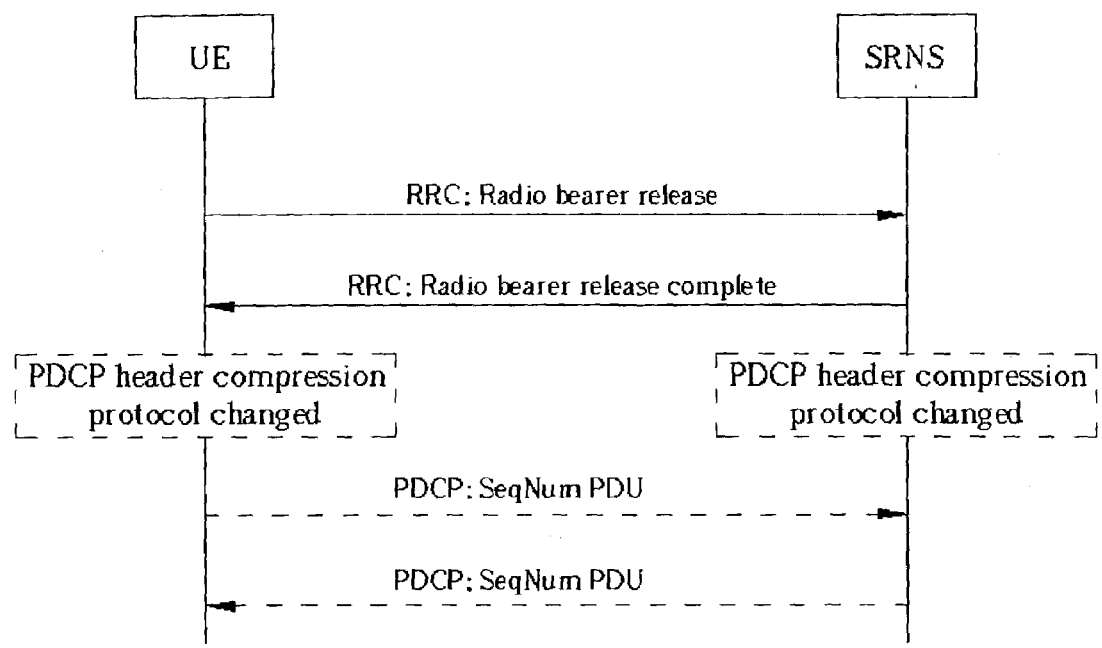
FIG. 20 is a second simplified message sequence chart according to the present invention for performing an RRC Radio Bearer Release procedure without performing an SRNS Relocation procedure.
Figure 21:
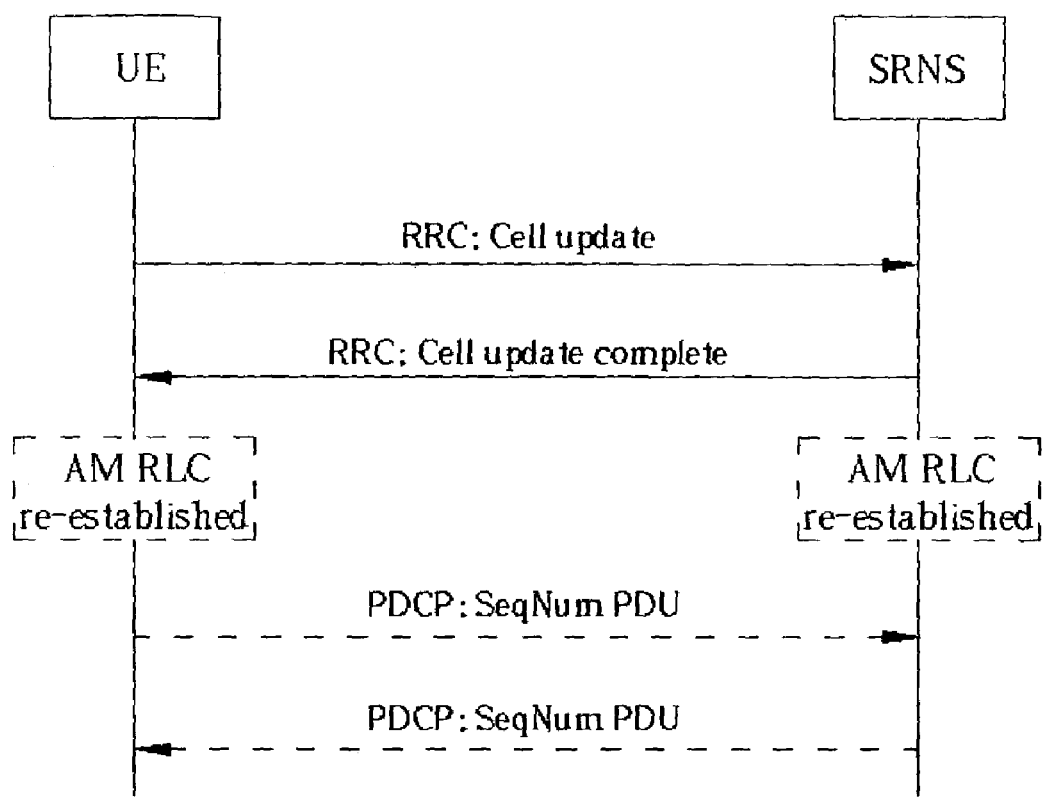
FIG. 21 is a first simplified message sequence chart according to the present invention for performing an RRC Cell Update procedure without performing an SRNS Relocation procedure.
Figure 22:
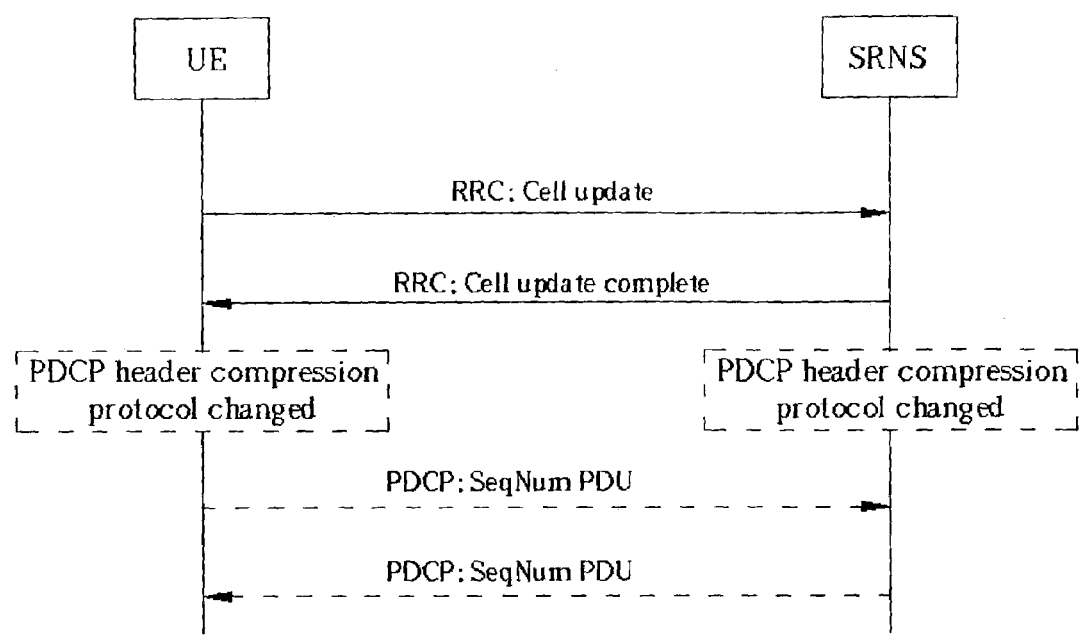
FIG. 22 is a second simplified message sequence chart according to the present invention for performing an RRC Cell Update procedure without performing an SRNS Relocation procedure.

FIG. 17 is a first simplified message sequence chart according to the present invention for performing an RRC 101 Radio Bearer Setup procedure without performing an SRNS Relocation procedure, and is analogous to FIGS. 14 and 16. FIG. 18 is a second simplified message sequence chart according to the present invention for performing an RRC 101 Radio Bearer Setup procedure without performing an SRNS Relocation procedure, and is analogous to FIGS. 15 and 17. FIG. 19 is a first simplified message sequence chart according to the present invention for performing an RRC 101 Radio Bearer Release procedure without performing an SRNS Relocation procedure, and FIG. 20 is a second simplified message sequence chart according to the present invention for performing an RRC 101 Radio Bearer Release procedure without performing an SRNS Relocation procedure. Finally, FIG. 21 is a first simplified message sequence chart according to the present invention for performing an RRC 101 Cell Update procedure without performing an SRNS Relocation procedure, and FIG. 22 is a second simplified message sequence chart according to the present invention for performing an RRC 101 Cell Update procedure without performing an SRNS Relocation procedure.

In contrast to the prior art, the present invention provides a re-synchronization module in the RRC layer that performs a PDCP sequence number synchronization process only when a next expected UL/DL Receive PDCP sequence number invalidity event is detected during the SRNS Relocation procedure, or when an RRC procedure, without performing an SRNS Relocation procedure, is performed that causes re-establishment of the RLC layer or change to the PDCP header compression protocol. Further, PDCP sequence number synchronization procedures are performed not just for the Radio Bearer Reconfiguration procedure, but also for Transport Channel Reconfiguration, Radio Bearer Setup, Radio Bearer Release, Cell Update, URA Update and UTRAN mobility information procedures.

What is claimed is:

1. A method for determining triggering of a packet data convergence protocol (PDCP) sequence number synchronization procedure in a wireless device, the wireless device utilizing a multi-layered protocol that includes:
   a radio resource control (RRC) layer for establishing and configuring radio links according to a plurality of RRC procedures;
   a PDCP layer for transfer of user data between users of PDCP services to generate corresponding PDCP protocol data units (PDUs); and
   a radio link control (RLC) layer for segmenting the PDCP PDUs for a medium access control (MAC) layer;
   the method comprising:

identifying execution of an RRC procedure;

when the RRC procedure triggers a serving radio network subsystem (SRNS) relocation procedure, then triggering the PDCP sequence number synchronization procedure only if a next expected UL/DL Receive PDCP sequence number invalidity event is detected during the SRNS relocation procedure; and when the RRC procedure does not trigger the SRNS relocation procedure, then triggering the PDCP sequence number synchronization procedure only if an RLC entity of a PDCP entity is re-established in response to the RRC procedure, or if a PDCP header compression protocol of the PDCP entity is changed in response to the RRC procedure.

2. The method of claim 1 wherein the RRC procedure further causes the RLC entity of the PDCP entity to be re-established.

3. The method of claim 1 wherein the RRC procedure further causes of causing causes the PDCP header compression protocol of the PDCP entity to be changed.

4. The method of claim 1 wherein the RRC procedure is selected from a set consisting of Transport Channel Reconfiguration, Radio Bearer Setup, Radio Bearer Release, Cell Update, RRC Radio Bearer Reconfiguration, URA Update, and UTRAN Mobility Information procedures.

5. The method of claim 1 wherein the PDCP sequence number synchronization procedure is triggered only if a PDCP PDU is not transmitted successfully by the RLC entity and the RLC entity is reestablished in response to the RRC procedure.

6. The method of claim 1 wherein the PDCP sequence number synchronization procedure is triggered only if a PDU is not transmitted successfully by the RLC entity and the PDCP header compression protocol of the PDCP entity is changed in response to the RRC procedure.

7. An improved wireless device comprising:
a radio resource control (RRC) layer for establishing and configuring radio links according to a plurality of RRC procedures;
a PDCP layer for transfer of user data between users of PDCP services to generate corresponding PDCP protocol data units (PDUs);
a radio link control (RLC) layer for segmenting the PDCP PDUs for a medium access control (MAC) layer; and
a packet data convergence protocol (PDCP) re-synchronization module for performing the following steps:
identifying execution of a radio resource control (RRC) procedure by the wireless device;
when the RRC procedure a triggers serving radio network subsystem (SRNS) relocation procedure, then triggering a PDCP sequence number synchronization procedure only if a next expected UL/DL Receive PDCP sequence number invalidity event is detected during the SRNS relocation procedure; and
when the RRC procedure does not trigger the SRNS relocation procedure, then triggering the PDCP sequence number synchronization procedure only if a radio link control (RLC) entity of a PDCP entity supported by the wireless device is reestablished in response to the RRC procedure, or if a PDCP header compression protocol utilized by the PDCP entity is changed in response to the RRC procedure.

8. The wireless device of claim 7 wherein the RRC procedure further causes the RLC entity of the PDCP entity to be re-established.

9. The wireless device of claim 7 wherein the RRC procedure further causes the PDCP header compression protocol of the PDCP entity to be changed.

10. The wireless device of claim 7 wherein the RRC procedure is selected from a set consisting of Transport Channel Reconfiguration, Radio Bearer Setup, Radio Bearer Release, Cell Update, RRC Radio Bearer Reconfiguration, URA Update, and UTRAN Mobility Information procedures.

11. The wireless device of claim 7 wherein the PDCP sequence number synchronization procedure is triggered by the PDCP re-synchronization module only if a PDCP PDU is not transmitted successfully by the RLC entity and the RLC entity is re-established in response to the RRC procedure.

12. The wireless device of claim 7 wherein the PDCP sequence number synchronization procedure is triggered by the PDCP re-synchronization module only if a PDU is not transmitted successfully by the RLC entity and the PDCP header compression protocol of the PDCP entity is changed in response to the RRC procedure.

* * * * *